(12) United States Patent
Heck et al.

(10) Patent No.: US 12,110,699 B2
(45) Date of Patent: Oct. 8, 2024

(54) SYSTEM FOR JOINING OR REINFORCING COMPONENTS

(71) Applicant: Ludwig Hettich Holding GmbH & Co. KG, Schramberg (DE)

(72) Inventors: Andreas Heck, Koenigsfeld-Neuhausen (DE); Ulrich Hettich, Schramberg (DE); Andreas Schwab, Dornhan (DE)

(73) Assignee: LUDWIG HETTICH HOLDING GMBH & CO. KG, Schramberg (DE)

( * ) Notice: Subject to any disclaimer, the term of this patent is extended or adjusted under 35 U.S.C. 154(b) by 0 days.

(21) Appl. No.: 17/865,512

(22) Filed: Jul. 15, 2022

(65) Prior Publication Data

US 2023/0022176 A1 Jan. 26, 2023

Related U.S. Application Data

(63) Continuation of application No. 16/472,114, filed as application No. PCT/EP2017/084230 on Dec. 21, 2017, now abandoned.

(30) Foreign Application Priority Data

Dec. 21, 2016 (DE) .......................... 102016125201.8

(51) Int. Cl.
*E04G 23/02* (2006.01)
*E04B 1/41* (2006.01)
(Continued)

(52) U.S. Cl.
CPC ............ *E04G 23/0218* (2013.01); *E04B 1/41* (2013.01); *E04G 21/185* (2013.01);
(Continued)

(58) Field of Classification Search
CPC ............ E04G 23/0218; E04G 21/185; E04G 2023/0262; E04B 1/41; F16B 5/0642;
(Continued)

(56) References Cited

U.S. PATENT DOCUMENTS 1,251,676 A * 1/1918 McCaffray .............. F16B 43/00
292/251
2,639,179 A * 5/1953 Phelps ................ E05B 65/0057
411/968
(Continued)

FOREIGN PATENT DOCUMENTS

CA 2388277 A1 * 12/2002 ............... E01B 9/10
CH 173307 A ‡ 11/1934
(Continued)

OTHER PUBLICATIONS

International Search Report and Written Opinion relating to Application No. PCT/EP2017/084230, dated Jul. 17, 2018.‡
(Continued)

*Primary Examiner* — Theodore V Adamos
(74) *Attorney, Agent, or Firm* — Grossman, Tucker, Perreault & Pfleger, PLLC

(57) ABSTRACT

The invention relates to a system for joining two components or for reinforcing a component, comprising a first and a second threaded sleeve which each comprise the following: an outer thread, with the aid of which the threaded sleeve can be screwed into the respective component and which is suitable to form a composite with the respective component, and a power drive, by which a torque for screwing the threaded sleeve into the respective component can be transmitted to the threaded sleeve. The system further comprises an elongate clamping element which is suitable to be guided through the second threaded sleeve and introduced into or guided through the first threaded sleeve, and which is suitable to axially clamp the first and the second threaded sleeve in such a manner that the first and the second threaded sleeve form opposed composite stresses in the respective component.

3 Claims, 7 Drawing Sheets

(51) Int. Cl.

| | | |
|---|---|---|
| *E04G 21/18* | (2006.01) | |
| *E04H 9/02* | (2006.01) | |
| *F16B 5/06* | (2006.01) | |
| *F16B 25/00* | (2006.01) | |
| *F16B 37/12* | (2006.01) | |
| *G06F 30/12* | (2020.01) | |
| *G06F 119/14* | (2020.01) | |

(52) U.S. Cl.
CPC .......... *F16B 25/0026* (2013.01); *G06F 30/12* (2020.01); *E04G 2023/0262* (2013.01); *E04H 9/021* (2013.01); *F16B 5/0642* (2013.01); *F16B 37/127* (2013.01); *G06F 2119/14* (2020.01)

(58) Field of Classification Search
CPC .... F16B 25/0026; F16B 37/127; E04C 5/163; E04C 5/07; E04C 5/03; E04C 5/125; G06F 30/12; G06F 2119/14; E04H 9/021
See application file for complete search history.

(56) References Cited

U.S. PATENT DOCUMENTS

| | | | | | |
|---|---|---|---|---|---|
| 3,667,338 | A | * | 6/1972 | Johansson | F16B 5/0283 411/378 |
| 4,022,099 | A | ‡ | 5/1977 | Ballantyne | F16B 25/0021 411/383 |
| 4,097,061 | A | ‡ | 6/1978 | Dietlein | A63C 5/06 280/607 |
| 4,655,656 | A | * | 4/1987 | Jonsson | F16B 5/0283 411/395 |
| 4,730,968 | A | ‡ | 3/1988 | Diperstein | F16B 37/122 411/178 |
| 5,234,300 | A | ‡ | 8/1993 | Fluckiger | F16B 5/0283 411/107 |
| 5,961,266 | A | * | 10/1999 | Tseng | F16B 37/12 411/289 |
| 5,993,129 | A | * | 11/1999 | Sato | F16B 13/124 411/80.6 |
| 7,441,998 | B2 | * | 10/2008 | Gahler | F16B 13/002 411/178 |
| 7,588,402 | B2 | ‡ | 9/2009 | Chuang | F16B 25/0021 411/383 |
| 7,736,381 | B2 | ‡ | 6/2010 | Biedermann | A61B 17/8635 606/301 |
| 7,752,824 | B2 | * | 7/2010 | Brown | F16B 21/16 52/223.13 |
| 8,920,093 | B2 | ‡ | 12/2014 | Hettich | F16B 25/0026 411/425 |
| 9,334,888 | B2 | * | 5/2016 | Flückiger | F16B 5/0283 |
| 10,047,776 | B2 | | 8/2018 | Hettich | |
| 10,233,957 | B2 | ‡ | 3/2019 | Hettich | F16B 25/0005 |
| 10,935,067 | B2 | ‡ | 3/2021 | Aufenanger | F16B 37/127 |
| 2002/0020136 | A1 | ‡ | 2/2002 | Mueller | E04B 1/2604 52/707 |
| 2006/0067803 | A1 | * | 3/2006 | Hsu | F16B 35/041 411/29 |
| 2007/0053763 | A1 | * | 3/2007 | Allaart | F16B 13/002 411/178 |
| 2008/0080945 | A1 | * | 4/2008 | Bee | E01D 22/00 411/44 |
| 2008/0179105 | A1 | * | 7/2008 | Duncan | E21B 10/02 175/420.1 |
| 2009/0092458 | A1 | ‡ | 4/2009 | Moroney | F16B 25/0026 411/29 |
| 2010/0316466 | A1 | * | 12/2010 | Hettich | B21C 37/122 411/395 |
| 2012/0183372 | A1 | ‡ | 7/2012 | Roessner | F16B 37/125 411/395 |
| 2012/0243953 | A1 | * | 9/2012 | Orberndorfer | B23G 5/20 408/1 R |
| 2012/0321411 | A1 | ‡ | 12/2012 | Podesser | F16B 25/0094 411/387.4 |
| 2014/0130449 | A1 | * | 5/2014 | Chadwick | E04B 2/702 52/843 |
| 2016/0003282 | A1 | ‡ | 1/2016 | Neumaier | F16B 25/0084 411/387.6 |
| 2016/0108948 | A1 | * | 4/2016 | Hettich | F16F 15/02 411/54 |

FOREIGN PATENT DOCUMENTS

| | | | | |
|---|---|---|---|---|
| CH | 279221 A | ‡ | 11/1951 | |
| CN | 2632374 Y | ‡ | 8/2004 | |
| CN | 202612315 U | ‡ | 12/2012 | |
| CN | 204876768 U | ‡ | 12/2015 | |
| DE | 2834200 A1 | ‡ | 2/1980 | |
| DE | 3000154 A1 | ‡ | 7/1981 | |
| DE | 29610381 U1 | ‡ | 9/1996 | ........... E04B 1/2612 |
| DE | 19610267 A1 | ‡ | 9/1997 | ............ E04D 12/00 |
| DE | 19830682 A1 | ‡ | 2/2000 | ........... E06B 1/6076 |
| DE | 10036754 C1 | ‡ | 6/2002 | ........... E04B 1/2612 |
| DE | 102004033472 A1 | | 1/2006 | |
| DE | 102204033472 A1 | ‡ | 1/2006 | |
| DE | 202006014469 U1 | ‡ | 1/2007 | ............... F24J 2/045 |
| DE | 20 2007 007550 U1 | ‡ | 9/2007 | ............. F16B 7/187 |
| DE | 102009022161 A1 | ‡ | 12/2010 | ............. F24J 2/5245 |
| DE | 102010014318 A1 | ‡ | 10/2011 | ........... F01D 25/243 |
| DE | 19428 A1 | ‡ | 11/2014 | |
| DE | 102013104478 A1 | ‡ | 11/2014 | ......... F16B 25/0026 |
| DE | 102013109428 A1 | | 11/2014 | |
| DE | 202013105729 U1 | ‡ | 3/2015 | ........... E04B 1/7637 |
| DE | 102014109329 A1 | ‡ | 1/2016 | ........... E04D 12/006 |
| DE | 102015213869 A1 | ‡ | 1/2017 | |
| EP | 1072802 A1 | ‡ | 1/2001 | ........... F16B 13/065 |
| EP | 1693578 A1 | * | 8/2006 | ........... F16B 13/002 |
| EP | 2816171 A2 | ‡ | 12/2014 | ........... E04F 10/0662 |
| FR | 2 520 455 A1 | ‡ | 7/1983 | |
| GB | 1111587 A1 | ‡ | 5/1968 | |
| GB | 2148969 A | ‡ | 6/1985 | ............... E04B 1/04 |
| JP | 2014145154 A | ‡ | 8/2014 | |
| NL | 2010093 C2 | ‡ | 7/2014 | |
| RU | 2105847 C1 | ‡ | 2/1998 | |
| TW | 459101 B | | 10/2001 | |
| WO | WO-2014/044677 A1 | ‡ | 3/2014 | |

OTHER PUBLICATIONS

German Office action regarding DE patent application 10 2016 125 201.8, no English translation available.‡
International Search Report regarding corresponding application PCT/EP2017/084230 dated Jul. 17, 2018.‡
International Search Report regarding corresponding application PCT/EP2017/084239 dated Jul. 17, 2018.‡
HILTI—Technisches Handbuch der Befestigungstechnik fur Hoch- und Ingenieurbau (Jan. 2014)—Auszug, insb. Seiten 85-92.‡
International Official Action dated Jun. 13, 2019 in relation to corresponding European Patent Application No. 17825857.0.‡
The State Intellectual Property Office of Peoples Republic of China, Office Action related to corresponding Chinese Application No. 100098 issued Aug. 25, 2020.‡
Official Action from corresponding European Patent Application No. 17825857.0, dated Jun. 13, 2019. No English translation available.
Hilti, "Technisches Handbuch der Befestigungstechnik fuer Hoch- und Ingenieurbau", 2014, excerpt, pp. 85-92.
English translation of the International Preliminary Report on Patentability from corresponding PCT Appln. No. PCT/EP2017/084230, dated Jun. 25, 2019. 13 pages.
English translation of the International Search Report and Written Opinion from corresponding PCT Appln. No. PCT/EP2017/084230, mailed Jul. 17, 2018. 12 pages.
International Search Report from corresponding PCT Appln. No. PCT/EP2017/084230, dated Jul. 17, 2018. 26 pages.
First Office Action from corresponding Chinese Patent Appln. No. 201780085224.9, dated Aug. 25, 2020, English translation attached. 13 pages.

(56) References Cited

OTHER PUBLICATIONS

International Search Report from corresponding PCT Appln. No. PCT/EP2017/084239, mailed Apr. 4, 2018. 2 pages.

\* cited by examiner
‡ imported from a related application

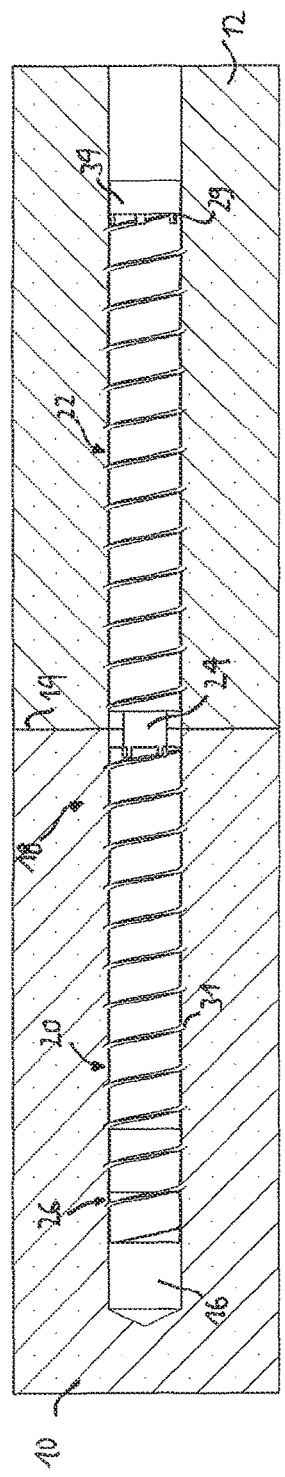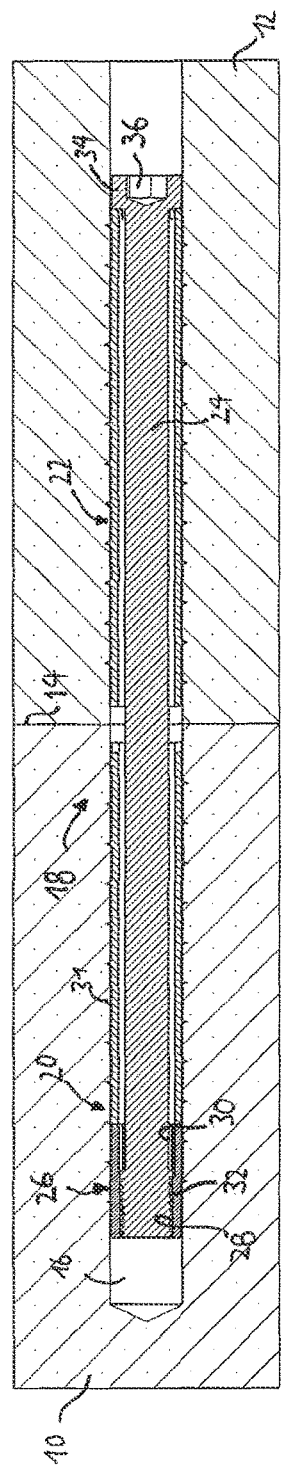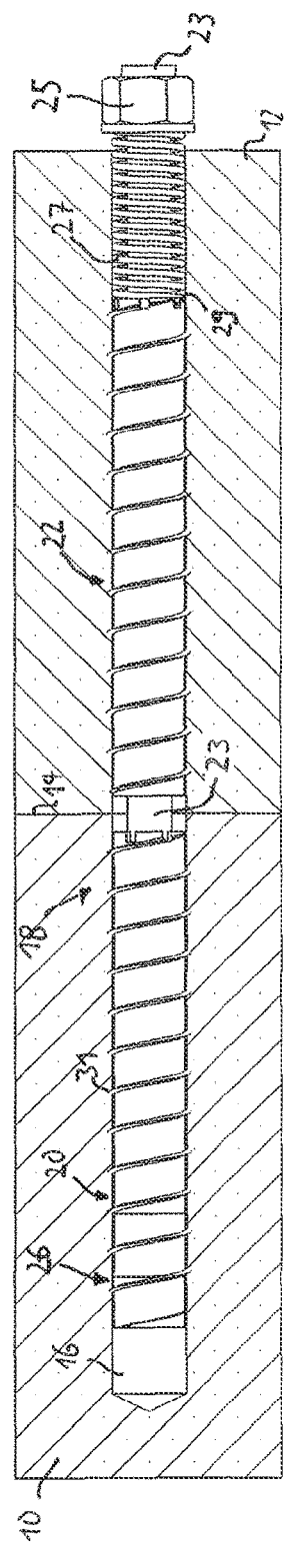

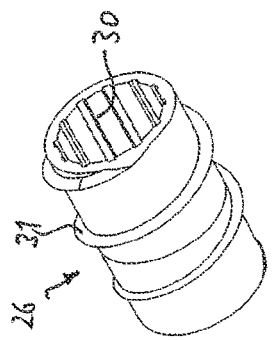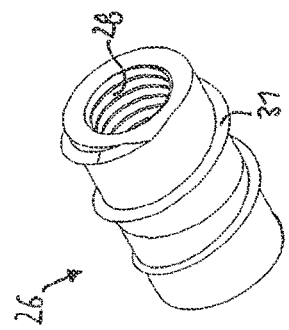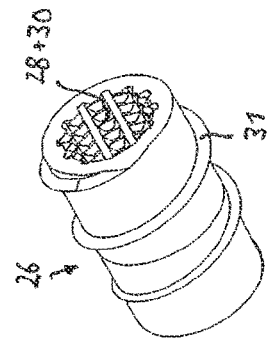
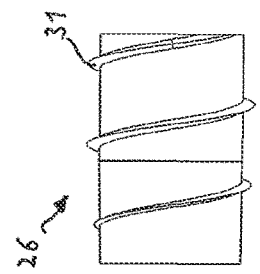
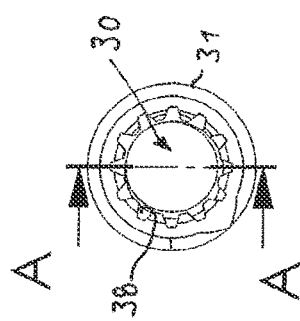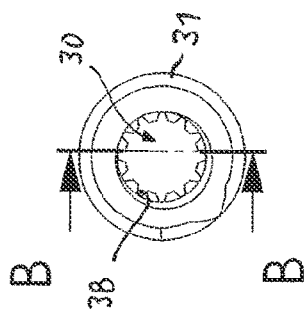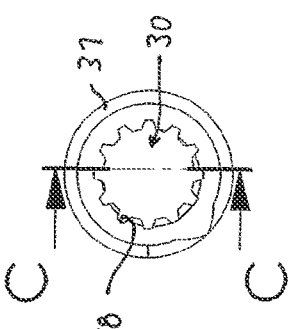
Fig. 3  Fig. 4  Fig. 5
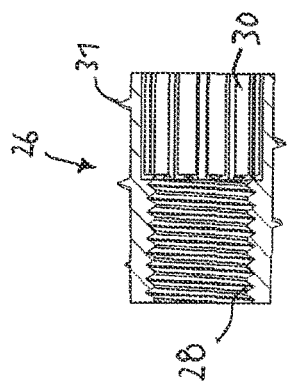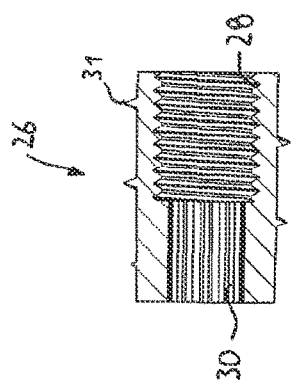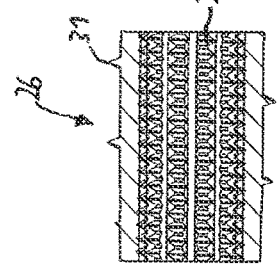

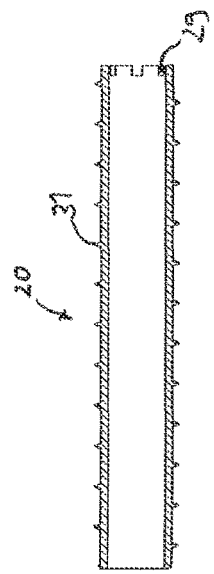
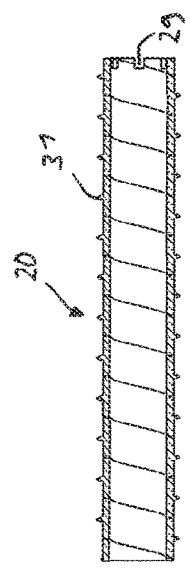
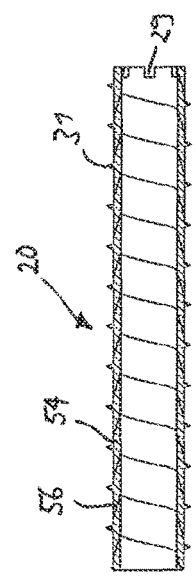
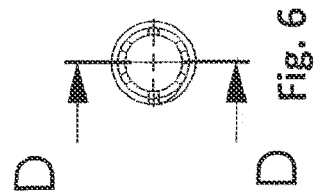
Fig. 6
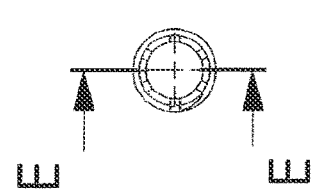
Fig. 7
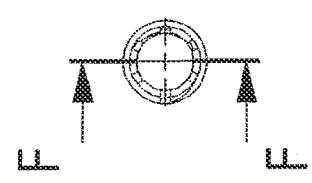
Fig. 8
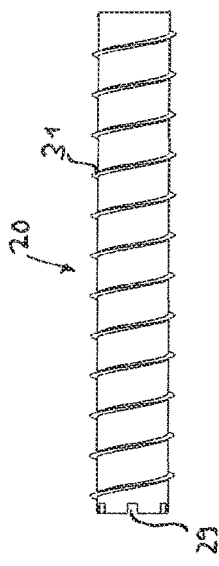
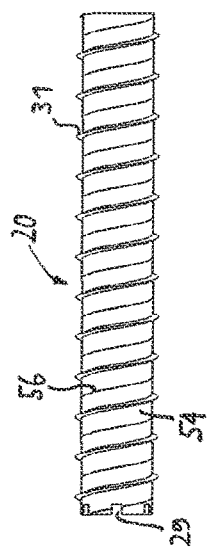
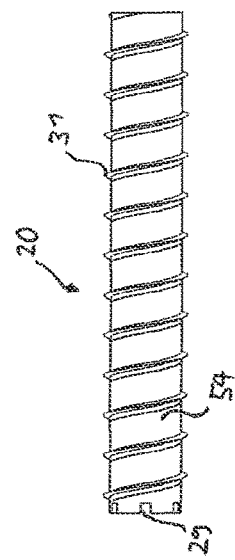

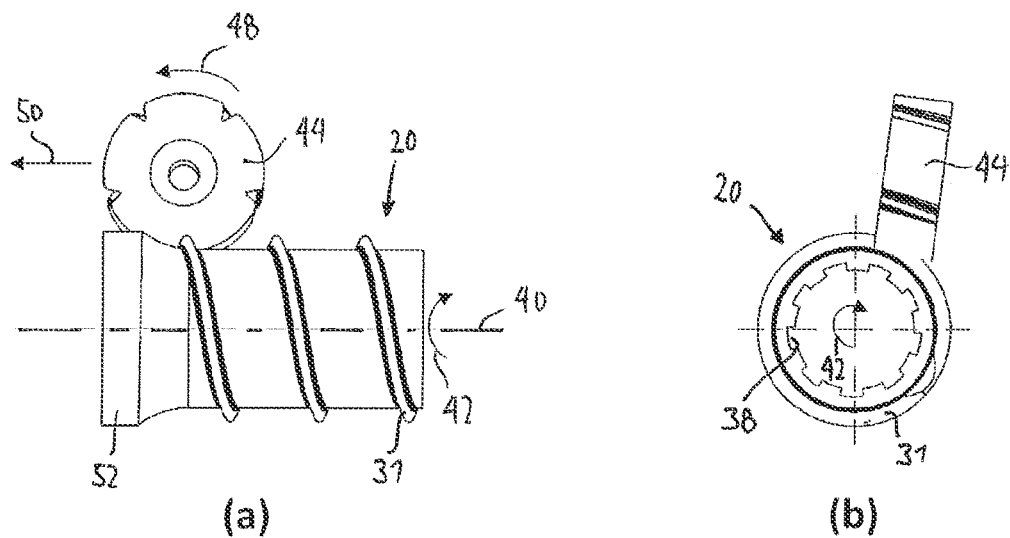
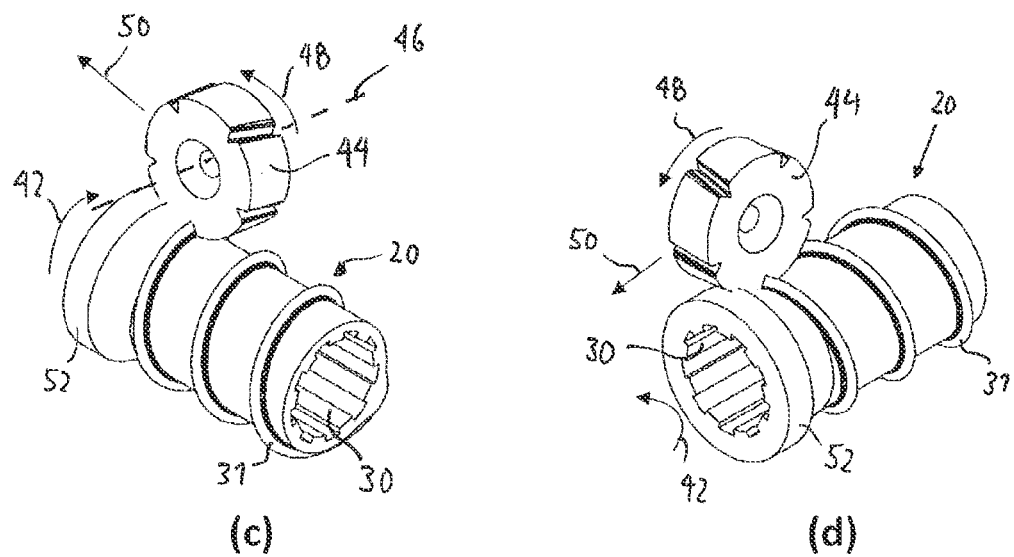
Fig. 9

SYSTEM FOR JOINING OR REINFORCING COMPONENTS

CROSS-REFERENCE TO RELATED APPLICATIONS

This application is a Continuation of U.S. patent application Ser. No. 16/472,114 filed Jun. 20, 2019, which is a 371 of International Application No. PCT/EP2017/084230 filed Dec. 21, 2017, which claims priority to DE10201612521.8 filed Dec. 21, 2016, the entire disclosure of each being incorporated herein by reference.

FIELD OF THE INVENTION

The present invention relates to the joining and reinforcing of components. In particular it relates to the joining and reinforcing of components made of concrete.

BACKGROUND AND RELATED PRIOR ART

It is known in the prior art to join components made of concrete with one another. It is known for example to provide an existing concrete structure with supplementary concrete components. One example for this is a bridge, to which bridge caps are to be attached. DE 10 2000 90074421 shows a bridge with bridge caps. On their top side and in part also laterally, the bridge caps are anchored by means of screws, which are inserted into previously introduced apertures. The screws can be embodied so as to be self-cutting.

It is furthermore known in the prior art to reinforce concrete components. Due to the fact that concrete has a high compressive strength, but only a low tensile strength, it is common to reinforce concrete components, for example by means of reinforcing steel rods, which are suitable for the absorption of tensile forces.

SUMMARY OF THE INVENTION

The object underlying the present invention is to provide an improved system for joining components or for reinforcing a component.

The system according to the invention comprises a first and a second threaded sleeve, which each comprise the following:
  an external thread, with the aid of which the threaded sleeve can be screwed into the respective component and which is suitable for the formation of a composite with the respective component, and
  a power drive, by means of which a torque for screwing the threaded sleeve into the respective component can be transmitted to the threaded sleeve.

The system further comprises an elongate clamping element, which is suitable for being guided through the second threaded sleeve and for being inserted into or guided through the first threaded sleeve and which is suitable for axially clamping the first and the second threaded sleeve in such a manner that the first and the second threaded sleeve generate opposed bond stresses in the respective component.

In a simplified embodiment of the system, the second threaded sleeve can also be omitted. In the case of this simplified embodiment, the elongate clamping element is suitable for being guided through a borehole in the component to be reinforced, or in the second component of the two components to be joined, respectively, and for being secured to the first threaded sleeve. In this simplified embodiment, the first threaded sleeve is clamped with the component to be reinforced, or with the second component of two components to be clamped, respectively, for example in that a head on the trailing end of the elongate clamping element, or a nut provided on a thread on the trailing end of the elongate clamping element, is screwed against the component to be reinforced, or the second component of two components to be joined. In this case, the above-cited bond stress only appears in the region of the first threaded sleeve. Unless they relate to the second threaded sleeve, all further advantageous embodiments described below also relate to this simplified alternative, without reference being separately made to this below. This simplified alternative can in particular also comprise a grooving tip according to one of the below-described embodiments and an elastic element, in particular a tension spring or a compression spring.

It is important to note that the information that the clamping element is suitable for being guided through the first and possibly second threaded sleeve does not mean that the first and (if available) the second threaded sleeve have first to be introduced into the borehole and that the clamping element is subsequently guided through the threaded sleeve(s). Rather, it is possible in certain embodiments first to introduce the elongate clamping element into the borehole, and then to attach or "thread" the threaded sleeve(s) to the clamping element, and screw them into the borehole so as to slide across the clamping element, wherein the clamping element, even though it is itself stationary, is likewise guided past the first and possibly the second threaded sleeve.

When using the system according to the invention, a threaded sleeve can in each case be arranged in a borehole on each side of a parting line. In the case of the joining of components, the "parting line" identifies in the usual way the boundary between the components, which abut against one another. In the case of a reinforcement, the "parting line" can be envisaged as a hypothetical crack, the appearance of which is to be prevented by the reinforcement. The two threaded sleeves are axially clamped, typically under tension by means of the clamping element, so that the threaded sleeves generate an opposed bond stress in the respective component via their respective external threads. This bond stress can be generated across the entire length, but at least across a significant portion of the length of the respective threaded sleeve. In the case of joining, the load is thus introduced into the respective component across a comparatively large section, and a uniform load distribution on both sides of the parting line can be achieved, whereby the stability of the connection is increased.

In the case of reinforcement, the bond stress creates an inherent stress distribution inside the component, which is to counteract forces that may occur in response to a load on the component. If the component is concrete, the system can, for example, prevent the formation of a crack as a result of a tensile load in that the component is prestressed with the aid of the system in terms of compression, which counteracts the tensile load. The difference from a conventional reinforcement is that a conventional reinforcement, regardless of whether it is implemented in terms of a reinforcing steel or a concrete screw, only develops its effect when a crack occurs. Even though a conventional reinforcement can prevent a widening of such a crack, it can absorb significant forces only when there are perceivable movements in the component, i.e. when the component starts to crack. With the system of the invention, in contrast, the bond stress is already generated by means of the prestressed system itself, in the completely intact component, so that the thread pitches of the external threads of the sleeves already absorb forces, before a crack even starts to form. In this way a significantly more effective reinforcement than is known in the prior art can be achieved.

The system preferably comprises a grooving tip, which is suitable for grooving a thread into the corresponding component, wherein the grooving tip comprises a power drive, by means of which a torque for screwing the grooving tip into the respective component can be transmitted to the grooving tip. In the present disclosure, a part comprising an external thread or at least a frontal or leading external threaded section, which is suitable specifically for cutting a thread in the component, is understood to be the "grooving tip". This threaded section can for example be especially hardened and additionally or alternatively can have teeth or the like, which facilitate the cutting of the thread. The grooving tip can be embodied as a separate part, but it can also be embodied as a frontal section of the first threaded sleeve. The second threaded sleeve, in turn, does not then require a corresponding grooving tip, because it can simply be screwed into the thread, which is grooved by means of the separate grooving tip, or by means of the grooving tip as part of the first threaded sleeve.

The component to be reinforced or the components to be joined preferably consists or consist of concrete, masonry, a composite material or a wood material. In the present disclosure, the term "concrete" is to be understood in a broad manner, and in particular is considered to be a generic term for the cement-bound composite materials: reinforced concrete, prestressed concrete, fibrous concrete, etc., but also for composite materials that are not cement-bonded, such as wet-mix aggregate, aerated concrete or resin concrete, without being limited to these.

In an advantageous embodiment, the elongate clamping element is formed by a screw or a threaded rod, which has at least one external thread, in particular a metric external thread, wherein at least one of the threaded sleeves or the grooving tip has an internal thread, into which the screw can be screwed. By screwing the thread of the screw/threaded rod into the internal thread of the respective threaded sleeve or grooving tip, respectively, the position of the threaded sleeve is thus changed directly, or by pushing through the grooving tip with respect to the screw/threaded rod. When the screw or threaded rod is then secured to the other sleeve in any way, the two sleeves can be axially clamped in this way by rotating the screw or threaded rod.

In the context of the simplified embodiment, which does not comprise a second threaded sleeve, the screw or threaded rod can be secured to the second component in the case of joining, for example, in that a screw head is screwed against the second component on the side of the second component facing away from the parting line, or in that a nut is screwed against the second component on the side facing away from the parting line. In the case of reinforcement with the aid of the simplified embodiment, which does not comprise a second threaded sleeve, the screw or threaded rod can be secured on the exterior of the component to be reinforced, for example in that a screw head is screwed from the exterior against the component, or in that a nut is screwed from the exterior against the component to be reinforced. It is important to note that the information that the nut or the screw head, respectively, "is screwed against the component" does not necessarily take into consideration that the head or the nut abuts directly against the second component. Further components, in particular a compression spring, can instead be arranged between the screw head or nut, and the component.

The at least one external thread is preferably embodied at least in the region of the leading end of the screw or threaded rod, and the grooving tip or the first threaded sleeve has the cited internal thread. The internal thread is preferably at least partially embodied in a leading section of the first threaded sleeve.

In an advantageous embodiment, the elongate clamping element is formed by a screw comprising a head, which is suitable for engaging directly with a trailing end of the second threaded sleeve or via an element located in-between, in order to clamp the second threaded sleeve in the direction of the first threaded sleeve as a result of the at least one external thread of the screw being screwed into the at least one internal thread of the first threaded sleeve. In terms of the above description, the screw is thus "secured" to the second threaded sleeve by way of this screw head. In a related advantageous embodiment, the elongate clamping element is formed by a threaded rod and the system furthermore comprises a nut, which, on a trailing end of the threaded rod, can be screwed onto the latter, in order to engage directly with a trailing end of the second threaded sleeve or by way of an element located in-between, and clamp the second threaded sleeve in the direction of the first threaded sleeve. It is emphasized, however, that the invention is not limited to these embodiments, but rather that a plurality of other alternatives is possible for securing the screw or threaded rod to one of the threaded sleeves.

In an alternative embodiment, the first threaded sleeve has, for example, a first internal thread, and the second threaded sleeve has a second internal thread, wherein the screw or threaded rod has a first and a second external thread, which are suitably dimensioned in order to be screwed into the first or second internal thread, respectively. The inner diameter of the second internal thread is larger than the inner diameter of the first internal thread, and the pitch of the first internal thread differs from the pitch of the second internal thread, and in particular is larger than the pitch of the second internal thread. In this embodiment, the first external thread of the screw can be guided past the second internal thread in the second threaded sleeve and can be screwed into the first internal thread in the first threaded sleeve. The second external thread of the screw is, or thereby becomes, engaged with the second internal thread in the second threaded sleeve. When the pitch of the first internal thread is larger than the pitch of the second internal thread, the two threaded sleeves are moved towards one another when the screw is screwed in, and are thus axially clamped. In a deviation from this embodiment, the first thread can also be embodied in the grooving tip instead of in the first threaded sleeve.

In an advantageous development, the system further comprises an elastic element, in particular a tension spring or a compression spring, which can be preloaded by actuating the clamping element, and which is in operative connection with the first threaded sleeve, the second threaded sleeve, and the clamping element in such a manner that the preloading of the elastic element contributes to, or effects, the axial clamping of the two threaded sleeves. In the case of the simplified embodiment without a second threaded sleeve, the elastic element effects an axial clamping of the first threaded sleeve against the second component of two components to be reinforced, or with the component to be reinforced, respectively. With the aid of such an elastic element, the level of the clamping of the sleeves against one another, and, as a result of this, the bond stress in the respective component, can be set comparatively precisely and can in particular be maintained, even if the component, the external thread of the threaded sleeves, the clamping element and/or the composite should yield slightly after assembly. It is to be expected, for example, that, in the case of simple clamping without an elastic element, the stress in the composite will decrease as a result of the ductility of the thread material, because a slight yielding of the external thread of the threaded sleeves can lead to a significant decrease of the bond stress. This is not the case, however, when the preloading is generated by an elastic element, because the preloading by the elastic element virtually does not change when the thread pitches yield slightly.

The elastic element is preferably formed in terms of a compression spring, which can suitably be arranged between the head of the screw or the nut, and the trailing end of the second threaded sleeve or, in the case of the simplified embodiment without a second threaded sleeve, can be arranged between the head of the screw or the nut, and the side, which faces away from the parting line, of the second component of two components to be joined, or between the head of the screw, or the nut, and the outer side of the component to be reinforced. This alternative enables a simple assembly and a simple structural design.

In an advantageous embodiment, the power drive of one or both threaded sleeves is formed by an inner profile or a slot. The power drive of the grooving tip is preferably formed by an inner profile.

In an advantageous embodiment, the inner profile has a smaller diameter than the internal thread, and the inner profile is arranged closer to the leading end of the grooving tip than the internal thread. This means that a corresponding drive tool will have a smaller outer diameter than the diameter of the internal thread, and can thus be guided past the internal thread all the way to the inner profile without any problems. In an alternative embodiment, the inner profile has a larger diameter than the internal thread, and the inner profile is arranged farther away from the leading end of the grooving tip than the internal thread. In this case, the drive tool will also have a larger diameter than the diameter of the internal thread, so that it cannot be guided past the said internal thread. Due to the fact, however, that the inner profile is arranged farther away from the leading end of the grooving tip in this embodiment, the drive tool does not need to be guided past the internal thread in this configuration, in order to be engaged with the inner profile.

In a further advantageous embodiment, at least some sections of the inner profile and the internal thread are embodied in the same axial section of the grooving tip. In this case, the internal thread and the inner profile overlap, as will be described in more detail below with the aid of an exemplary embodiment.

In an advantageous embodiment, the inner profile extends over the entire length of the respective threaded sleeve or of the grooving tip. This embodiment has special advantages with regard to manufacture, because it enables the sleeve comprising the inner profile to be made from a tube with an inner contour by means of drawing, wherein the inner contour corresponds to the inner profile of the drive.

In an advantageous embodiment, the inner profile is embodied as a hexagonal socket or a hexalobular socket.

The inner profile preferably has a plurality of wedge-shaped recesses, which are embodied as keyways or as spherical elements, for purposes of accommodating a tool.

In an advantageous embodiment, the first and/or the second threaded sleeve consists of a drawn tube comprising an inner profile, on or in which, respectively, the external thread and/or an internal thread is embodied by means of forming or machining, in particular by means of hob peeling. This embodiment enables comparatively cost-efficient production and also provides high stability due to the massive design.

In an alternative embodiment, the first and/or the second threaded sleeve is wound. A wound sleeve can likewise be produced comparatively cost-efficiently.

In a further aspect, the invention relates to a method for reinforcing a component by using a system according to one of the above-described embodiments. The method comprises the following steps:

drilling a borehole into the component to be reinforced, screwing the first threaded sleeve into the borehole, so that the said first threaded sleeve assumes a first position in the component, screwing the second threaded sleeve into the borehole, so that the said second threaded sleeve assumes a second position in the component, inserting the elongate clamping element through the second threaded sleeve and into or through the first threaded sleeve, and axial clamping of the first and of the second threaded sleeve in such a manner that the first and the second threaded sleeve generate opposed bond stresses in the respective component.

In this method, the elongate clamping element can be guided through the second threaded sleeve and into or through the first threaded sleeve, after the first and the second threaded sleeve have been screwed into the borehole, and are secured with a leading end to the first threaded sleeve. Alternatively, however, it is also possible that the elongate clamping element is first inserted into the borehole, and the elongate clamping element is guided through the first and the second threaded sleeve, in that the first and the second threaded sleeve are threaded onto the elongate clamping element and are screwed into the borehole, wherein a leading end of the elongate clamping element is secured to the first threaded sleeve, in that the first threaded sleeve abuts against a stop element on the leading end of the elongate clamping element, in particular a screw head or a nut.

When the method is executed with the simplified system, which only comprises one threaded sleeve, this first threaded sleeve is screwed into the borehole, so that the said first threaded sleeve assumes a first position in the component, the elongate clamping element is guided into the borehole before or after the first threaded sleeve is screwed in, a leading end of the elongate clamping element is secured to the first threaded sleeve, and the first threaded sleeve axially clamps with the component in such a manner that the second threaded sleeve is loaded in the direction of the entrance to the borehole.

The method is preferably executed in a concrete component, in particular a concrete ceiling. The reinforcing method is particularly preferably executed in the vicinity of load-bearing columns, walls, beams and supports of the concrete ceiling. In the prior art a serious problem is the strength of concrete ceilings in the vicinity of load-bearing structures, such as columns, walls, beams and supports. The inventors have determined that the system according to the invention is ideal for reinforcing purposes, in order to avoid cracks in concrete ceilings in the vicinity of such load-bearing structures, and in order to increase the load-bearing capacity of the component to be reinforced. It is of crucial importance that the system of the invention provides for a prestressed reinforcement, which is already in operation before any cracks appear in the concrete.

In an advantageous embodiment, the level of the bond stress is set to a predetermined value, in particular by using a predetermined screw-in torque of a screw, which forms the elongate clamping element, or by controlled preloading of the cited elastic element. Suitable preloads as well as the suitable placement of the reinforcement can be determined by means of static analyses or calculations using the finite elements method.

In an advantageous further development of the method, the level of the bond stress is controlled after the introduction of the reinforcement and is readjusted, if applicable, in particular at regular maintenance intervals. It is an essential advantage of the system according to the invention that the bond stress in the respective components can be readjusted by actuating the clamping element, in order to counteract changes in the component or in the parts of the system, e.g. due to the ductility of the material.

When the method is executed with a simplified system, which only comprises one threaded sleeve, the elongate clamping element can also have, on its leading end, a stop element, in particular a screw head or a nut, which is screwed on, and the elongate clamping element can first be inserted into the borehole, the first threaded sleeve can be threaded onto the elongate clamping element and can be screwed into the borehole, and the leading end of the elongate clamping element can be secured to the first threaded sleeve, in that the first threaded sleeve abuts against the stop element on the leading end of the elongate clamping element.

A further aspect of the invention relates to a method for joining a first and a second component using a system according to one of the above-described embodiments, comprising the following steps: drilling a borehole into the first and the second component, screwing the first threaded sleeve into the borehole, so that the said first threaded sleeve assumes a first position in the component, screwing the second threaded sleeve into the borehole, so that the said second threaded sleeve assumes a position in the second component, which is spaced apart from the first position, inserting the elongate clamping element through the second threaded sleeve and into or through the first threaded sleeve, and axial clamping of the first and of the second threaded sleeve in such a manner that the first and the second threaded sleeve generate opposed bond stresses in the respective component.

In this method, the elongate clamping element can, as in the case of the reinforcement, be guided through the second threaded sleeve and into or through the first threaded sleeve, after the first and the second threaded sleeve have been screwed into the borehole and are secured with a leading end to the first threaded sleeve. Alternatively, however, it is also possible here that the elongate clamping element is first inserted into the borehole, and the elongate clamping element is guided through the first and the second threaded sleeve, in that the first and the second threaded sleeve are threaded onto the elongate clamping element and are screwed into the borehole, wherein a leading end of the elongate clamping element is secured to the first threaded sleeve, in that the first threaded sleeve abuts against a stop element on the leading end of the elongate clamping element, in particular a screw head or a nut.

Alternatively, the method for joining a first and a second component can also be executed using an above-described simplified system, which only comprises one (first) threaded sleeve. Such a method comprises the following steps: drilling a borehole into the first and the second component, screwing the first threaded sleeve into the borehole, so that the said first threaded sleeve assumes a position in the first component, inserting the elongate clamping element into the borehole before or after the first threaded sleeve is screwed in, securing a leading end of the elongate clamping element to the first threaded sleeve, and axial clamping of the first threaded sleeve with the second component.

A preferred embodiment relates to a method for joining a first and a second component, wherein at least the first component is made of concrete, and wherein the connection between the first and the second component during intended use experiences a transverse load Q as well as a tensile load N, whereby $Q/N \geq -0.25$, preferably $Q/N \geq 0.5$, and particularly preferably $Q/N \geq 1$. If, for example, the components are components of a structure, the loads during "intended use" are those loads, which actually appear, or which can appear, in practice on the connection in the finished structure, and which are taken into account when planning the structure. In this case, a borehole is introduced into the first and the second component at an angle a of between 20° and 80°, preferably between 30° and 75°, to the parting line between the first and the second component.

In conventional methods for joining components, secondarily introduced connecting elements, thus in particular clamping elements in terms of the present invention, are always arranged normal to the component surface or parting line, respectively. This manifests itself in particular by means of the International regulations for anchoring systems in concrete, which currently apply for structural engineering, all of which are to be anchored normal to the concrete surface according to the regulations. If mounted parts (corresponding to a "second component" in terms of the present invention) are attached to concrete, tensile as well as transverse loads have to be safely transmitted, wherein the transverse load can lead to a high bending load in the clamping element. As the distance of the load introduction into the clamping element in the mounted part (second component) to the parting line between the first and the second component increases, the bending load increases while the same load acts on the second component. Typical clamping elements in terms of the present invention, i.e. in particular screws or threaded rods, are rod-shaped, flexible connecting means and are thus only able to transmit transverse loads to a limited extent. To effectively utilize the clamping element in a join connection of components, it should thus be subjected to tension, if possible. This is the reason why the method according to the invention provides that, in the event that, in addition to a tensile load N normal to the parting line, a significant transverse load Q also appears, which is at least 25%, preferably at least 50% and particularly preferably 100% of the tensile load N, the borehole is not embodied normal to the parting line, but at an angle $\alpha$, which is inclined with respect to the borehole. These angles of inclination $\alpha$ always lie between 20° and 80°, in preferred embodiments between 30° and 75°.

The particular angle of inclination $\alpha$ is chosen in such a manner that the percentage of the tensile load in the clamping element, which is introduced at an inclined angle, is larger than if the same clamping element with the same load of the connection were to be introduced normal to the parting line.

In an advantageous further development, the step of clamping comprises the loading of a compression spring, which is arranged between the second component and the head or the nut on the trailing end of the elongate clamping element, or the loading of a tensile spring belonging to the clamping element. The terms "leading end" and "trailing end" refer to the orientation when the clamping element is inserted into the borehole.

In an advantageous development, the method is executed using a system according to one of the above-described embodiments. Such a system can also comprise the above-cited simplified system, which does not comprise a second threaded sleeve.

BRIEF DESCRIPTION OF THE FIGURES

FIG. 1a shows a view of two components, which are connected with a system according to an embodiment of the invention.

FIG. 1b shows the same view as in FIG. 1a in cross section.

FIG. 2 shows a similar view to FIG. 1a, in which, in a deviation from FIG. 1a, a compression spring and a threaded rod are used.

FIG. 3 shows a longitudinal sectional view, a plan view, and a perspective view of a grooving tip.

FIG. 4 shows a longitudinal sectional view, a plan view, and a perspective view of a grooving tip in an alternative embodiment.

FIG. 5 shows a longitudinal sectional view, a plan view, and a perspective view of a grooving tip in yet another alternative embodiment.

FIG. 6 shows a side view, a plan view, and a longitudinal cross-sectional view of a massive threaded sleeve.

FIG. 7 shows a side view, a plan view, and a longitudinal cross-sectional view of a wound threaded sleeve.

FIG. 8 shows a side view, a plan view, and a longitudinal view of a wound threaded sleeve comprising contact surfaces, which are inclined towards the longitudinal axis.

FIG. 9 shows four perspective views of a threaded sleeve and of a tool for hobbing.

DESCRIPTION OF THE PREFERRED EMBODIMENTS

Figure 10:
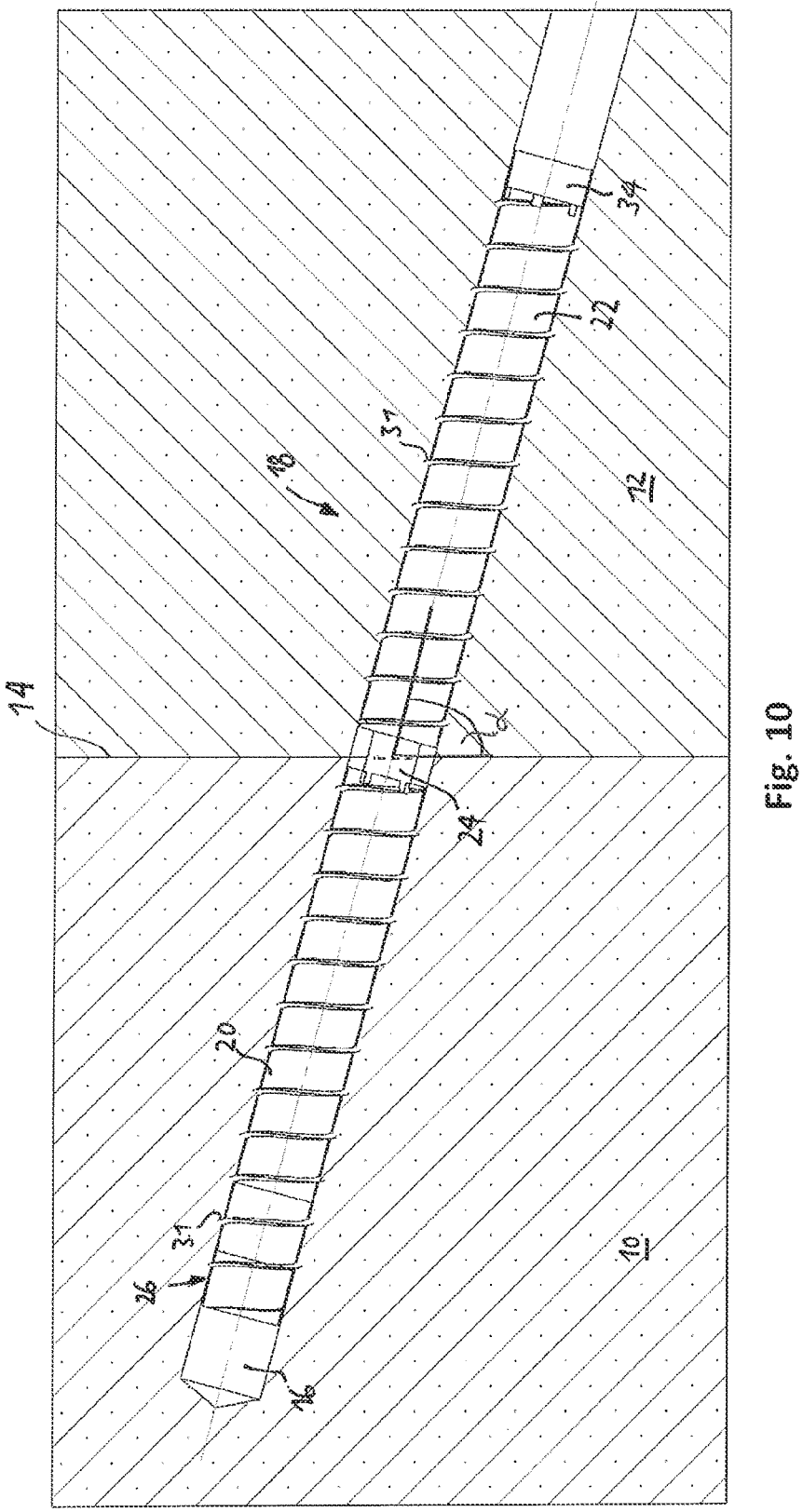
FIG. 10 shows a view of two components, which are connected with a system according to an embodiment of the invention, wherein the borehole is arranged so as to be inclined at an angle to a parting line between the components.

Further advantages and features of the invention follow from the description below, in which the invention is described on the basis of an exemplary embodiment with reference to the enclosed drawings.

FIG. 1a shows a first component 10 and a second component 12 of concrete, which abut against one another on a parting line 14. FIG. 1b shows the same view in cross-section. A borehole 16 extends through the two components 10 and 12, in which borehole a system 18 is arranged, which is designated for connecting or joining, respectively, the two components 10, 12. The system 18 comprises a first threaded sleeve 20 and a second threaded sleeve 22, as well as an elongate clamping element 24, which is formed by a screw in the embodiment as shown. The first threaded sleeve 20 is arranged in the first component 10, and the second threaded sleeve 22 in the second component 12.

The system 18 further comprises a grooving tip 26, which is arranged in the region of the leading end of the first threaded sleeve 20, and which is shown in more detail in FIG. 3. In the embodiment as shown, the grooving tip 26 is a separate part, but in other embodiments it can also be embodied as part of the first threaded sleeve 20. The grooving tip 26 has a metric internal thread 28 and an inner profile 30, which forms a power drive, by means of which a torque for screwing the grooving tip 26 into the first component 10 can be transmitted to the grooving tip 26. The first and the second threaded sleeve 20, 22 also have a power drive, which is formed by slots 29 in the trailing end of the respective threaded sleeve 20, 22. Both threaded sleeves 20, 22 further have an external thread 31.

On its leading end, the screw 24 has a metric external thread 32 and, on its trailing end, a screw head 34, in which a power drive 36 is embodied.

The function of the system 18 will be described next: to connect the components 10 and 12 to one another, the borehole 16 is first embodied. The grooving tip 26 is then screwed into the borehole 16, namely through the second component 12, into the first component 10. A drive tool (not shown) is used for this purpose, which is engaged with the inner profile 30 in the grooving tip 26. The grooving tip 26 is suitable for grooving a thread into the components 10, 12. Next, the first threaded sleeve 20 is screwed into the borehole 16, until it abuts against the trailing end of the grooving tip 26 in the first component 10. Finally, the second threaded sleeve 22 is screwed into the borehole, but remains in the second component 12. Due to the fact that a thread is already grooved into the borehole 16 by means of the grooving tip 26, the threaded sleeves 20, 22 can be screwed in comparatively easily.

After the two threaded sleeves 20, 22 have assumed their positions in the first or second component 10, 12, respectively, as shown in FIGS. 1a and 1b, the screw 24 is guided through the second threaded sleeve 22 and the first threaded sleeve 20 into the grooving tip 26 and is screwed with its metric external thread 32 into the metric internal thread on the leading end of the grooving tip 26, until the head 34 of the screw 24 abuts against the trailing end of the second threaded sleeve 22, as is shown in FIGS. 1a and 1b. By means of further screwing in the screw 24, the first and the second threaded sleeve 20, 22 are axially clamped, wherein the threaded sleeves 20, 22 generate a corresponding opposed bond stress in conjunction with the components 10, 12 via their external threads 31. It is important to note that a simplified system can also be used, which does not include the second threaded sleeve 22. In this case, the head 34 of the screw 24 would be embodied so as to be wider than the borehole 16, and it would be supported on the side of the second component 12 facing away from the parting line 14. The components 10 and 12 can thus also be clamped with one another. The advantage of this embodiment is that the additional second sleeve 22 can be omitted. Instead of using the bond stress in the second sleeve 22, the force, with which the first and the second component 10, 12 are clamped, is applied only via the head 34 of the screw 14 in this case.

This bond stress can be generated across the entire length, at least across a significant portion of the length of the respective threaded sleeve 20, 22. The applied preload is thus introduced into the respective component 10, 12 across a comparatively large section. In addition, a uniform load distribution on both sides of the parting line 14 can be attained, whereby the load-bearing capacity of the structure is increased. The respective length of the threaded sleeves 20, 22 is ideally to be chosen in such a manner that the shape changes, which occur under load, are approximately identical on both sides of the parting line. The load introduction surfaces in the two components 10, 12, which are to be connected, are preferably almost identical, whereby a comparable shape change on both sides of the parting line 14 is attained under load, which is advantageous for the calculated anticipation of the relative component movements. This mode of action is generally independent of the alignment inside the components to be joined, at least insofar as it is a homogenous material. The material wood forms an exception to this, which, due to the direction of its fibers, exhibits an anisotropic behavior. The system 18 and its use are not limited to applications in which the borehole 16 runs normal to the parting line 14 between the components 10, 12, as shown in FIGS. 1a, 1b, and 2. Instead, applications, in which the system 18 is inserted at an angle to the parting line 14, are also provided, as will be described in more detail below with reference to FIG. 11.

Although it is the joining of two components 10 and 12 that is shown in FIGS. 1a and 1b, it can also be understood on the basis of the Figures, how the system 18 can be used to reinforce a component. Suppose that instead of a parting line, reference numeral 14 marks a position, at which a crack, which is to be prevented by means of the reinforcement, could be formed in the component under tensile loading of the component. In other words, the position of the system 18 is chosen in such a manner in the case of reinforcement that it is arranged transversely to anticipated cracks. Due to the bond stress, the system 18 generates an inherent stress distribution inside the component, which counteracts tensile forces, which could lead to a crack 14. In concrete terms, the formation of a crack 14 as a result of a tensile load is counteracted in that the component is compressed with the aid of the system 18 in the region around the anticipated crack 14, and an external tensile load, which could possibly cause the crack 14, is thus counteracted. A significant difference as compared to a conventional "loose" reinforcement lies in the fact that a conventional reinforcement only takes effect when a crack forms, because the reinforcement can only then exert significant forces on the component. With the system 18 of the invention, in contrast, the bond stress is already generated by the preloaded system 18 even in the completely intact component, so that the thread pitches of the external thread 31 of the sleeves 20, 22 already absorb forces, before a crack 14 even starts to form. A simplified system with only one (first) threaded sleeve can also be used for the purpose of reinforcement. This sole threaded sleeve can then also be embodied to be longer than is shown in FIG. 1a, and can in particular extend across the anticipated crack 14.

FIG. 2 shows a similar view to that in FIG. 1a, but in which a threaded rod 23, onto which a nut 25 is screwed in order to clamp the first and the second threaded sleeve 20, 22 against one another, is used instead of a screw 24. In this embodiment, a compression spring 27 is arranged between the nut 25 and the trailing end of the second threaded sleeve 22, which compression spring is preloaded with a predetermined force by screwing the nut 25 onto the threaded rod 23. It is thereby ensured that the stress is maintained even if the external thread 31 of the grooving tip 26 or of the first and of the second threaded sleeve 20, 22, respectively, yields slightly under load, for example as a result of the ductility of the material.

FIG. 3 shows a longitudinal cross-sectional view, a plan view, a side view, and a perspective view of the grooving tip 26. As can be seen, the height of the thread pitch of the external thread 31 within the last approximately one and a half turns decreases to zero in the direction of the leading end, in order to facilitate the screw-in. The thread 31 is especially hardened in this region. Even though this is not shown in the illustration, the thread can have teeth in the region of the grooving tip 26, which teeth increase the cutting effect and further facilitate the screw-in and grooving. At its front end, the core of the grooving tip 26 is furthermore embodied so as to be slightly conical. As can in particular be discerned from the longitudinal cross-sectional view, the metric internal thread 28 in the case of the grooving tip 26 of FIG. 3 is located on the leading end of the grooving tip 26. On the side facing away from the leading end, the inner profile 30 adjoins, which, in the embodiment shown, has a star shape, comprising a plurality of wedge-shaped recesses 38, which face radially outwards and with which an appropriate tool (not shown) can engage in order to exert a torque on the grooving tip 26 and thus on the threaded sleeve 20 as a whole. It is important to note that the diameter of the inner profile 30 is large enough for the screw 24 to be capable of being guided past the inner profile 30 unhindered, in order then to be screwed into the metric internal thread 28 of the grooving tip 26 with its metric external thread 32.

FIG. 4 shows an alternative embodiment, in which the arrangement of the metric internal thread 28 and of the inner profile 30 are exchanged, i.e. the inner profile 30 is located on the leading end of the grooving tip 28, and the internal thread 28 adjoins it on the side facing away from the leading end, in this embodiment. In this embodiment, the inner diameter of the metric internal thread 28 is larger than the inner diameter of the inner profile 30, so that a drive tool (not shown) can be guided past the internal thread 28 unhindered, in order to exert a torque by way of the inner profile 30. Which one of the two embodiments is chosen depends on practical considerations and on the application. With otherwise identical dimensions, the embodiment of FIG. 3 allows for the use of a drive tool comprising a larger diameter, so that higher torques can be exerted. With otherwise identical dimensions, the embodiment of FIG. 4 allows for an increased wall thickness of the grooving tip 26, which promises a higher stability.

Finally, FIG. 5 shows an embodiment, in which the inner profile 30 and the metric internal thread 28 are embodied in the same axial section inside the grooving tip 26. The inner profile 30 and the internal thread 28 thus overlap here. This embodiment can be significant in particular with regard to manufacture, namely when the grooving tip 26 or the threaded sleeve 20, 22 is to be made of a drawn tube comprising an inner profile 30, which then necessarily extends across the entire length of the grooving tip 26 or of the threaded sleeve 20, 22, respectively. With suitable dimensioning, as is shown in FIG. 5, the internal thread 28 can additionally be cut into the inner profile 30, into which the screw 24 can be screwed with its metric external thread 32.

FIG. 6 shows an embodiment of a "massive" threaded sleeve 20, i.e. a threaded sleeve 20, which is made from continuous tubing. This embodiment is characterized by particularly good stability. The threaded sleeve 20 is preferably made of a drawn tube comprising an inner contour, which corresponds to the inner profile 30 (not shown in FIG. 6). The external thread 31 can then be produced by forming, in particular by "grooving". Alternatively, however, it is also possible to embody the external thread 31 by means of machining, in particular by means of hob peeling. If the internal thread 28 is embodied in the threaded sleeve 20 (not shown in FIG. 6), the said internal thread can also be produced by forming or by machining processes.

FIG. 9 shows four perspective views for illustration of a hob peeling process. A threaded sleeve 20 is shown therein, which is rotated about its longitudinal axis 40, wherein the direction of the rotation is shown by the arrow 42. A tool 44, which rotates (see arrow 48) about a tool axis 46 (see perspective c) and which is furthermore moved in the direction of the arrow 50 parallel to the sleeve axis 40, is also shown in FIG. 9. Reference numeral 52 identifies the region, in which the material is not yet peeled by the tool 44.

The external thread 30 of the sleeve 20 can be produced comparatively quickly and cost-efficiently by means of hob peeling.

FIG. 7 shows an alternative embodiment of a threaded sleeve 20, in which the sleeve 20 is wound from a tape 54. The tape is tightly wound, so that the edges of the tape 54 abut against one another on contact surfaces 56, and a closed sleeve 20 results. As can in particular be discerned from the longitudinal cross-sectional view, these contact surfaces 56 are arranged essentially normal to the longitudinal axis of the sleeve 20. Prior to being wound from the tape, the thread pitch of the external thread 31 can for example be embodied by means of rolling. The metric internal thread 28 (not shown in FIG. 7) can also be embodied prior to the winding on the other side of the tape 54. Such a wound threaded sleeve 20 can be produced comparatively cost-efficiently.

Finally, FIG. 8 shows a modified form of the wound threaded sleeve 20, which differs from the embodiment of FIG. 7 in that the contact surfaces 56 are no longer essentially normal to the longitudinal axis of the sleeve 20, but are inclined to the longitudinal axis by an angle, which is more than 10°, preferably more than 25°, and particularly preferably more than 45°. As a result, the threaded sleeve 22 can expand under strong axial tension, in that the contact surfaces 56 slide along one another as a result of a tension-induced deformation. The anchoring effect can thus be intensified, in particular in cracked concrete.

It is important to note that the threaded sleeves 20, 22 are only disclosed as part of the system 18 of the invention in the present description and in the enclosed claims. The threaded sleeves 20, 22 described and claimed here can nevertheless also be used apart from the system 18 and thus have an independent significance and inventive quality. The threaded sleeves 20, 22 can be provided, for example, with an internal thread, in particular a metric internal thread 28, which extends across the entire or the predominant portion of its length, and which serves to attach parts with the aid of a screw.

Specifically, the massive threaded sleeve, as is shown in FIG. 6, can be made of carbon steel or stainless steel. The inner profile 30, which serves for the power drive transmission of the screw-in torque, can extend across a portion, or across the entire length, of the inner contour. Finally, the threaded sleeves 20, 22 can be heat-treated at least partially, depending on the intended use, in particular in the region of the leading end or of the grooving tip 26.

While the system 18 is aligned normal to the parting line 14 in FIGS. 1a, 1b and 2, preferred uses of the system 18 and preferred methods for joining components 10, 12 envisage the arrangement of the system 18 at an angle α, which differs from 90°, to the parting line 14. This is shown in an exemplary manner in FIG. 10. This angle α can be, for example, between 20° and 80°, preferably between 30° and 75°. A non-normal arrangement is advantageous in particular when the component load parallel to the parting line 14 is at least as large as the stress normal to the parting line 14. In the case of such load spectra, a system 18, which is arranged normal to the parting line 14, would be very strongly subjected to bending. An inclined system, i.e. a system, in which a does not equal 90°, can be subject to tensile load under these circumstances, with a significantly higher failure resistance as compared to the failure resistance when subjected to bending.

Figure 11:
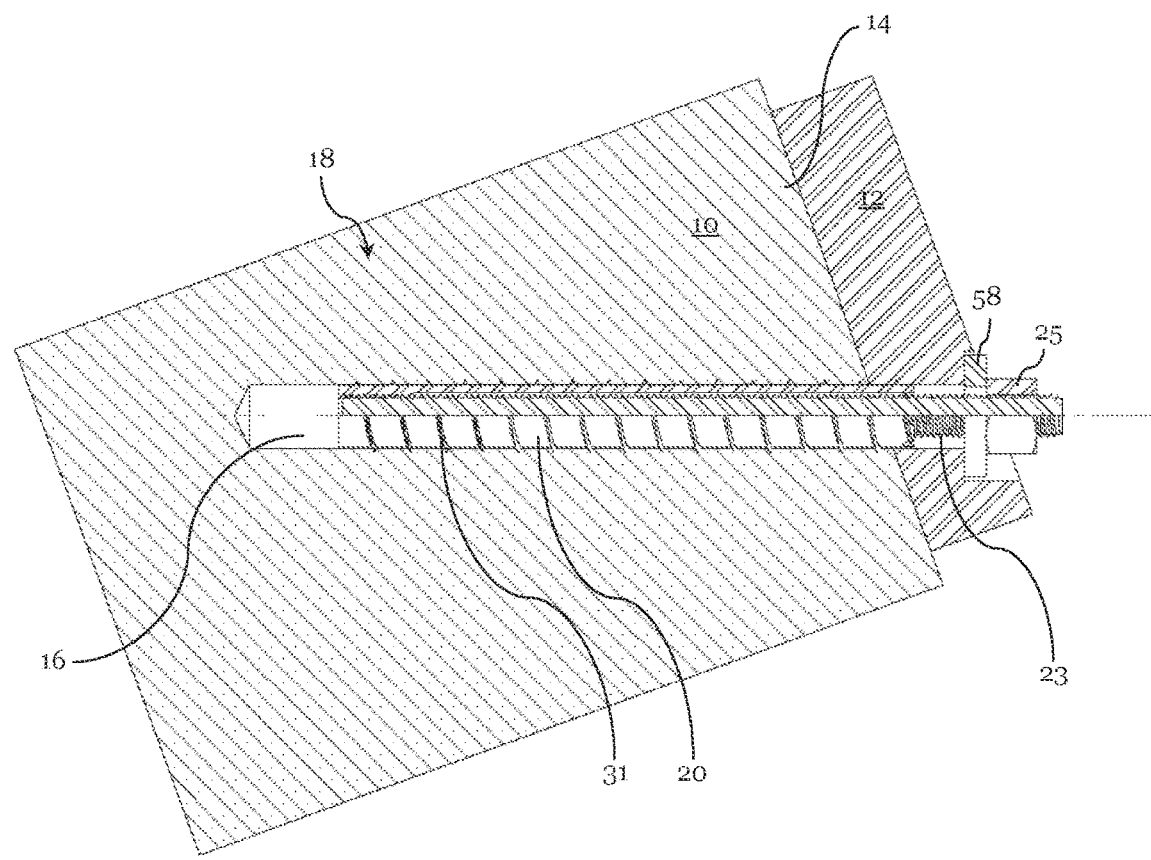
FIG. 11 shows an embodiment of a simplified system, which only comprises one (first) threaded sleeve.

FIG. 11 shows a partially sectioned view of a simplified system, which, as shown in the Figure, can be used to join a first and a second component 10, 12, but which can also be used for the purpose of reinforcement (not shown). The essential difference of this system 18 as compared to the above-described systems lies in that the system 18 comprises only one (first) threaded sleeve 20. In this exemplary embodiment, this first threaded sleeve 20 is embodied to be longer than the first threaded sleeve 20 in the above-described systems 18, which each included two threaded sleeves 20, 22, but this is not necessarily the case. The threaded sleeve 20 has an internal thread, into which a threaded rod 23 is screwed. A washer 58, which is clamped against the second component 12 with the aid of a nut, is attached to the threaded rod 23. In this way the threaded sleeve 20 is clamped to the second component 12. It is important to note that in the illustration of FIG. 11, the borehole 16 is also positioned at an angle, which does not equal 90°, to the parting line 14 between the first and the second component 10, 12.

Figure 12:
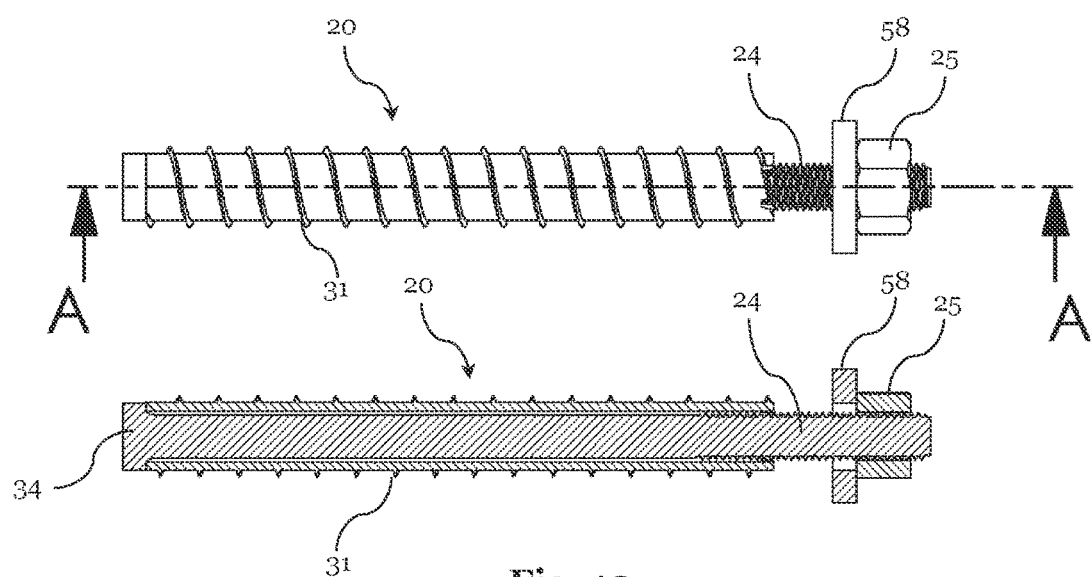
FIG. 12 shows an embodiment of a simplified system comprising only one (first) threaded sleeve, in which the clamping element is formed by a screw, comprising a screw head, which serves as a stop element for the first threaded sleeve.

FIG. 12 shows a side view and a cross-sectional view of a simplified system, which only comprises one (first) threaded sleeve 20. In this system, the clamping element 24 is formed by a screw comprising a screw head 34, which in this case forms the leading end when it is inserted into the borehole 16. This system is assembled in such a manner that the clamping element 24 is first inserted into the borehole head 34, and the threaded sleeve 20 is subsequently guided over the shaft of the screw (or is "threaded" onto the shaft, respectively), and is screwed into the component (not shown in FIG. 12). The screw head 34 thereby forms a stop element for the first threaded sleeve 20. If the clamping element 24 is clamped by tightening the nut 25 on the trailing end against the component 10 to be reinforced or—in the case of joining—against the second component 12 in the direction of the entrance to the borehole 16, the threaded sleeve 20 abuts against the head 34 and is clamped in the direction of the entrance to the borehole (that is, to the right in the illustration of FIG. 12). The advantage of this embodiment lies in the fact that the clamping element 24 can be secured to the first threaded sleeve 20 without having to embody an internal thread therein. The production of the threaded sleeve 20 is thus significantly simplified.

Figure 13:
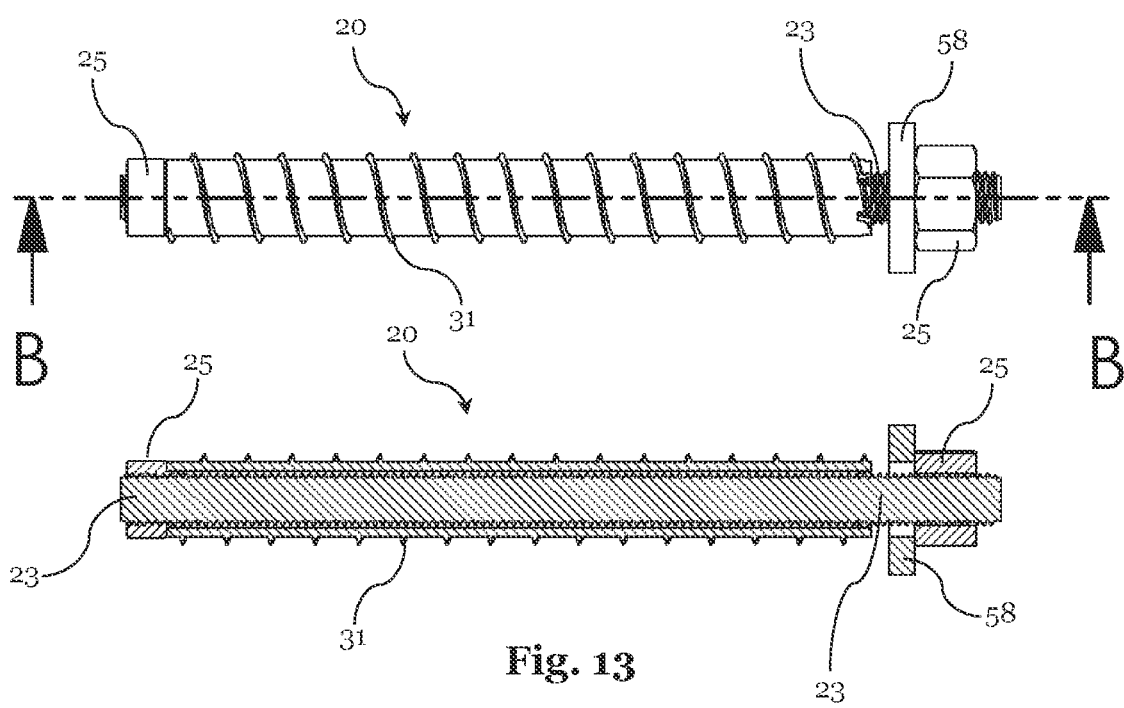
FIG. 13 shows an embodiment of a simplified system comprising only one (first) threaded sleeve, in which the clamping element is formed by a threaded rod, to the leading end of which a nut is screwed, which serves as a stop element for the first threaded sleeve.

It is important to note that the stop element on the leading end of the clamping element 24 can be formed in any manner, wherein the screw head 34 only represents an example. An alternative is shown in FIG. 13, in which the clamping element 24 is formed by a threaded rod 23, to the leading end of which a nut 25 is screwed as a stop element.

It is to be noted that the above-described embodiments are to be considered to be purely exemplary and as not limiting the invention and that the described features can be significant in any combination.

REFERENCE LIST

10 first component
12 second component 14 parting line/position of an anticipated crack
16 borehole
18 system for joining or reinforcing components
20 first threaded sleeve
22 second threaded sleeve
23 threaded rod
24 screw
25 nut
26 grooving tip
27 compression spring
28 metric internal thread
29 slot (power drive)
30 inner profile (power drive)
31 external thread
32 metric external thread of the screw 24
34 screw head
36 force application of the screw 24
38 recess in the inner profile 30
40 longitudinal axis of the threaded sleeve 20
52 direction of rotation of the threaded sleeve 20
44 tool for hob peeling
46 axis of the tool 44
48 direction of rotation of the tool 44
50 direction of the translational movement of the tool 44
52 suggested outer shape of the blank for manufacturing the threaded sleeve 20
54 tape for winding a threaded sleeve 20
56 contact surface between adjacent windings of the tape 54

What is claimed is:

1. A method for reinforcing a concrete component comprising the following steps:
    drilling a borehole into the component to be reinforced,
    screwing a first threaded sleeve into the borehole, so that the said first threaded sleeve assumes a first position in the component,
    screwing a second threaded sleeve into the borehole, so that the said second threaded sleeve assumes a second position in the component, which differs from the first position,
    inserting an elongate clamping element through the second threaded sleeve and into or through the first threaded sleeve, and axial clamping of the first and of the second threaded sleeve in such a manner that the first and the second threaded sleeve generate opposed bond stresses in the respective component.

2. The method according to claim 1, in which
    the elongate clamping element is first inserted into the borehole, and the elongate clamping element is guided through the first and the second threaded sleeve, by threading the first and the second threaded sleeve onto the elongate clamping element and screwing the first and second threaded sleeves into the borehole, wherein a leading end of the elongate clamping element is secured to the first threaded sleeve, in that the first threaded sleeve abuts against a stop element on the leading end of the elongate clamping element.

3. A method for joining a first and a second component comprising the following steps:
    drilling a borehole into the first and the second component,
    screwing a first threaded sleeve into the borehole, so that said first threaded sleeve assumes a position in the first component,
    screwing a second threaded sleeve into the borehole, so that said second threaded sleeve assumes a position in the second component, which is spaced apart from the first position,
    inserting an elongate clamping element through the second threaded sleeve and into or through the first threaded sleeve, and axial clamping of the first and of the second threaded sleeve in such a manner that the first and the second threaded sleeve generate opposed bond stresses in the respective component, wherein the elongate clamping element is first inserted into the borehole, and the elongate clamping element is guided through the first and the second threaded sleeve, by threading the first and the second threaded sleeve onto the elongate clamping element and screwing the first and second threaded sleeve into the borehole, wherein a leading end of the elongate clamping element is secured to the first threaded sleeve, in that the first threaded sleeve abuts against a stop element on the leading end of the elongate clamping element.

* * * * *